L. W. BARGER.
REVERSING MECHANISM FOR LOCOMOTIVES.
APPLICATION FILED DEC. 9, 1912.
1,057,796.
Patented Apr. 1, 1913.
2 SHEETS—SHEET 1.
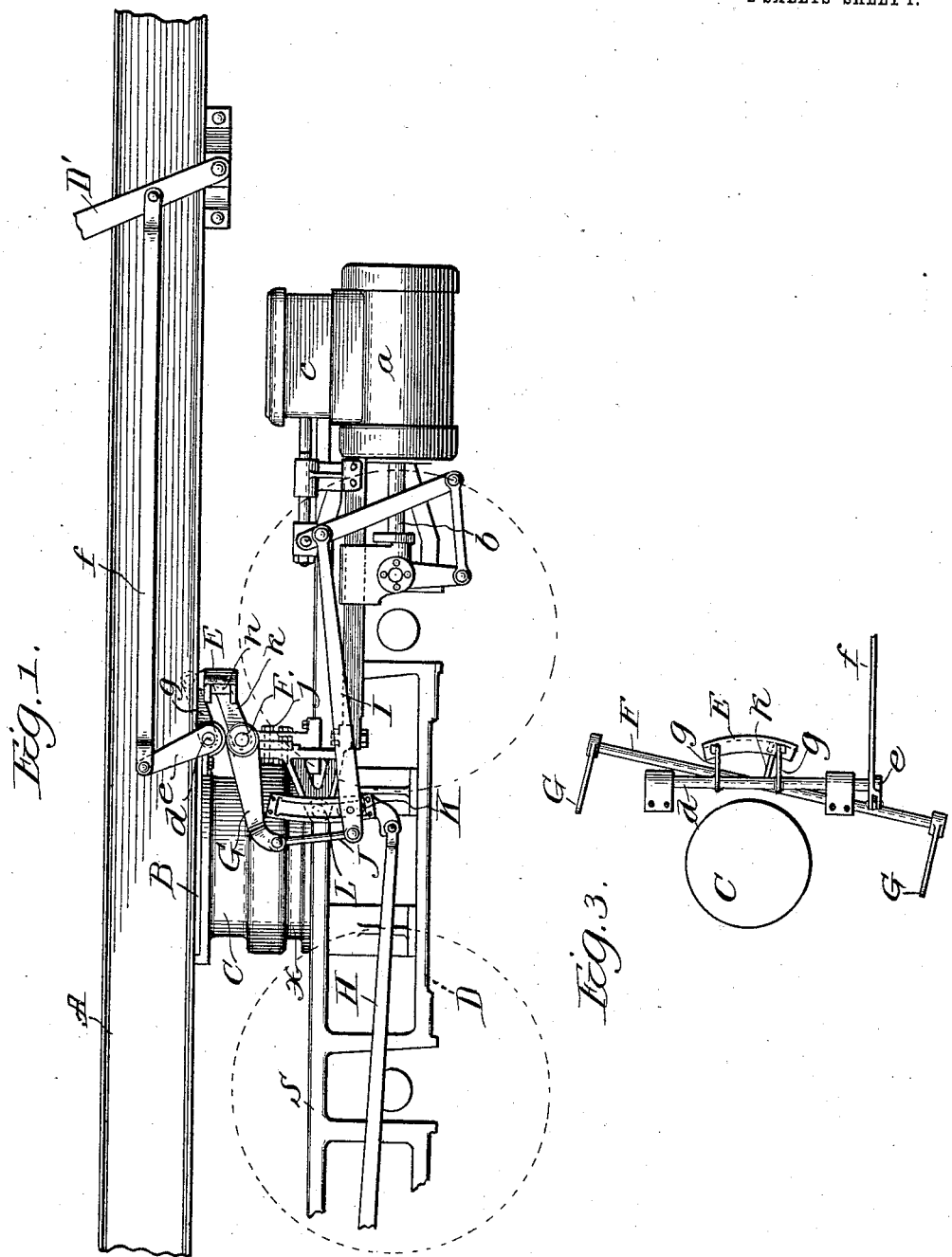
Witnesses
O. M. Wermich
E. K. Lundy
Inventor
Lorin W. Barger
by Frank D. Thomason
Atty.

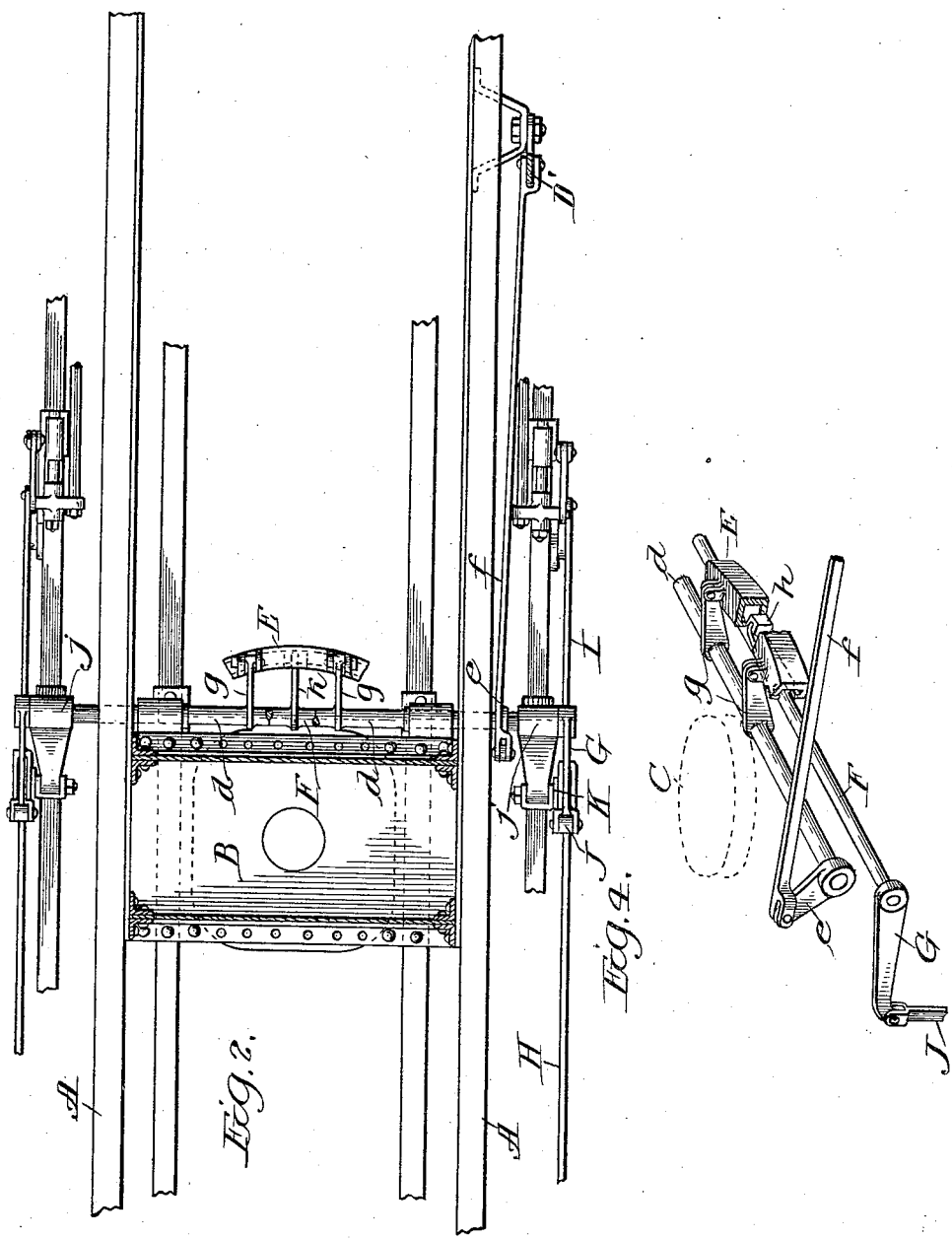

ature of which mechanism, which is at the rear of the truck, is similar in all respects to that of the rock-shaft $d$ and its mechanism.

UNITED STATES PATENT OFFICE.

LORIN W. BARGER, OF DAVENPORT, IOWA, ASSIGNOR TO DAVENPORT LOCOMOTIVE WORKS, OF DAVENPORT, IOWA, A CORPORATION OF IOWA.

REVERSING MECHANISM FOR LOCOMOTIVES.

1,057,796.　　　　Specification of Letters Patent.　　Patented Apr. 1, 1913.

Application filed December 9, 1912. Serial No. 735,603.

*To all whom it may concern:*

Be it known that I, LORIN W. BARGER, a citizen of the United States, residing at Davenport, in the county of Scott and State of Iowa, have invented new and useful Improvements in Reversing Mechanism for Locomotives, of which the following is a full, clear, and exact description.

My invention relates to the reversing gear for locomotives having reciprocable valve controlled driving gear on the trucks thereof.

The object of my invention is to enable the engineer to transmit motion from the cab or superstructure of the locomotive to the reversing mechanism of the reciprocable valve controlled driving gear mounted upon a pivoted truck or truck-frame by means that will, without interfering with the action of the said reversing gear, accommodate itself to or permit the turning of the truck on its pivotal center through and to the various angles said truck assumes in its travel over the car tracks upon which the locomotive runs. This I accomplish by the means hereinafter fully described, and as particularly pointed out in the claims.

In the drawings.—Figure 1 is a side elevation of a portion of an engine truck and a portion of the engine structure supported thereby to which the mechanism constituting my invention is applied. Fig. 2 is a plan view thereof. Figs. 3 and 4 are, respectively, diagrammatical views illustrating the operation of the same.

Referring to the drawings, it will be observed that the underframe supporting the boiler and superstructure of the type of locomotives to which my invention is adapted to be applied, comprises suitable side-sills A, A, a bolster B connecting said side-sills and a center-bearing plate C secured in proper position to the underside of said bolster. This underframe is supported by a truck D, the wheels of which are driven by reciprocable valve controlled driving-gear, including a cylinder $a$, a piston $b$ reciprocable therein and a suitable slide-valve (not shown) within the steam-chest $c$. A detailed description of this driving gear and reciprocable valve-gear is, however, unnecessary to a thorough understanding of my invention, and so I have dispensed with the same, and confined myself more particularly to the description of improved means for transmitting the movement exerted from the superstructure or cab of the locomotive, to the links of the reversing gear mounted on the truck, through the medium of which latter the reversing is accomplished in the usual manner.

Immediately in front of the center-bearing C there is a transverse rock-shaft $d$ that is journaled in suitable bearings secured to the lower edges of side-sills A, and has one end thereof extended beyond its bearings and provided with an arm $e$. The outer end of this arm is connected by means of a rod $f$, which is reciprocated, and thereby made to rock shaft $d$, by means of a suitable lever D′.

Between its bearings shaft $d$ is provided with two corresponding arms $g$, $g$, that are, preferably, located on opposite sides of a point midway between the side-sill and at equal distances therefrom. These arms $g$ are shown as projecting from shaft $d$ in a direction away from center bearing plate C, and suspend a transversely disposed horizontal coupling segment E. It is, however, within the scope of my invention to have shaft $d$ located farther from center plate C with the arms $g$, $g$, projecting toward center bearing plate C and suspend, in the same manner, the transversely disposed horizontal coupling segment E. The curvature of this segment is struck from the pivotal center of said bearing plate C, and is U-shape in cross-section with its open side preferably facing said plate, and has lugs projecting upward from its upper side at or near each end by means of which it is pivotally connected to and suspended from arms $g$. Said segment is also provided with a sliding block $h$ in its channel, which latter is so constructed as to retain said block therein, and prevent the same falling out either from the open side of the segment or from its ends.

Journaled in suitable bearings $j$ secured to and arising from the side-frames S of the truck, preferably, in such position that when the said truck is traveling on a straight track it will be immediately below shaft $d$ and parallel therewith, is a transverse rock-shaft F. The shaft F as an arm $k$ projecting therefrom in a direction away from the pivotal center of the truck centerplate $x$, and in such position that its length will aline with an imaginary line radiating from said pivotal center.

The ends of shaft F project through their bearings and have corresponding arms G, G, projecting therefrom, preferably, in a direction opposite that of arm k. The ends of these arms are connected by means of the hanger J to that portion of the valve gear which requires being raised or lowered in order to secure the usual reversing of the position of the valve on its seat. In Figs. 1 and 2, where a stationary link type of valve gear is shown, the ends of these arms are connected to the adjacent end of the longitudinally disposed radius rod I by means of a hanger J, and radius rod I is pivotally connected to block K which latter travels in the longitudinal slot or guide-way of the link L.

The link L is suitably fulcrumed to a bracket or casting mounted on the truck, and through the medium of the radius rod I, and a connecting rod H pivotally connected to its lower end, accomplishes the reversal of the motion of the driving gear either by moving the radius rod I upward from the position it is shown to occupy in Fig. 1 of the drawings, past its center to the upper portion of the link, or from the uppermost position of the block in the link to the lowermost position thereof.

In operation, the reversal of the drive-gear is effected by moving the sliding block K and connected end of radius rod I either above or below the fulcrum of link L. This I accomplish by moving lever D' through the medium of the shaft d, segment E and arm k rocking shaft F and raising arms G, G, and causing the latter by means of rod H to move the adjacent end of the radius rod I upward until block K is above the fulcrum of the link. When shaft d is rocked in the opposite direction, arms g, segment E, and arm k will move upward and rock shaft F in the opposite direction, and arms G, G, will move downward and, through the medium of rod H, move the radius rod I downward until said block K is below the fulcrum of link L again.

The above operation of my invention will take place no matter at what angle the wheels of the truck will be traveling with reference to the length of the superstructure of the locomotive,—the length of the segment E being such that it will permit the arm k and the shaft F to always be in engagement therewith.

It is immaterial as far as my invention is concerned what the construction of the boiler or underframe of the locomotive is, or what the construction of the truck may be, or by what mechanism the link is enabled to accomplish the reversal of the valve motion, in view of the fact that the invention which it is desired to embody in this application is confined to the novel means for transmitting motion from the superstructure of the locomotive to the link supported by the trucks, I, therefore, desire to be considered as contemplating any changes that may take place in the construction of these several parts of the locomotive, so long as they do not necessitate a change in the principle of my invention as hereinbefore set forth, as coming within the scope of my invention.

What I claim as new is:

1. The combination with the superstructure of a locomotive, a truck upon which the same is pivotally mounted, reciprocable valve controlled drive-gear carried by said truck and reversing gear connected therewith, of means for operating said reversing gear including mechanism mounted on and movable bodily as a whole with said superstructure and mechanism mounted on and bodily movable with said truck, and devices interposed between said mechanisms that engage in a curved course struck from the pivotal center of said superstructure and truck and permit the change in relative position thereof when said truck turns.

2. The combination with the superstructure of a locomotive, a truck upon which the same is pivotally mounted, reciprocable valve controlled drive-gear carried by said truck and reversing gear connected therewith including a link, a block reciprocable in the slot therein and a longitudinal radius rod fulcrumed to said block, of a transverse drive-shaft journaled in bearings mounted on said superstructure, a transverse driven shaft journaled in bearings mounted on said truck that actuate said reversing gear, and means for transmitting the movement of the former to the latter that accommodate the turning of the truck.

3. The combination with the superstructure of a locomotive, a truck upon which the same is pivotally mounted, reciprocable valve controlled drive-gear carried by said truck, and reversing gear connected with said drive-gear and also carried by the truck, of a transverse rock-shaft journaled in bearings mounted on said superstructure, an arm projecting therefrom a transverse rock-shaft journaled in bearings mounted on said truck, and a horizontal transversely disposed segment suspended from the arm of the superstructure shaft, which is slidingly engaged by the arm projecting from the truck-shaft, and is adapted to rock the truck-shaft regardless of the movements of said truck.

4. The combination with the superstructure of a locomotive, a truck upon which the same is pivotally mounted, reciprocable valve controlled drive-gear carried by said truck, and reversing gear connected with said drive-gear and also carried by the truck, of a transverse rock-shaft journaled in bearings mounted on said superstructure, an arm projecting therefrom, a transverse rock-shaft journaled in bearings on said truck, a horizontal transversely disposed U-shaped segment suspended from the arm of the superstructure shaft the open side of which faces toward the pivotal center of the truck, and a block slidable in the channel of said segment, and engaged by the arm projecting from the truck-shaft, and adapted to rock the truck-shaft regardless of the movement of said truck.

5. The combination with the superstructure of a locomotive, a truck upon which the same is pivotally mounted, reciprocable valve controlled drive-gear carried by said truck and reversing gear connected therewith including a link, a block reciprocable in the slot therein and a longitudinal radius rod fulcrumed to said block, of a drive shaft journaled in bearings mounted on said superstructure, a transverse driven shaft journaled in bearings mounted on said truck that actuate said reversing gear, and means for transmitting the movement of the former to the latter that accommodate the turning of the truck.

6. The combination with the superstructure of a locomotive, a truck upon which the same is pivotally mounted, reciprocable valve-controlled drive-gear carried by said truck, and reversing-gear connected therewith, of a transverse drive-shaft journaled in bearings mounted on said superstructure, a transverse driven-shaft in a plane below said drive-shaft which is journaled in bearings mounted on said truck and actuates said reversing gear, and means for transmitting the movement of the former to the latter that accommodate the turning of the truck.

In witness whereof I have hereunto set my hand this 13th day of November 1912.

LORIN W. BARGER.

Witnesses:
    VICTOR F. LUCHT,
    JAMES FORREST.

Copies of this patent may be obtained for five cents each, by addressing the "Commissioner of Patents, Washington, D. C."